Figure 1:
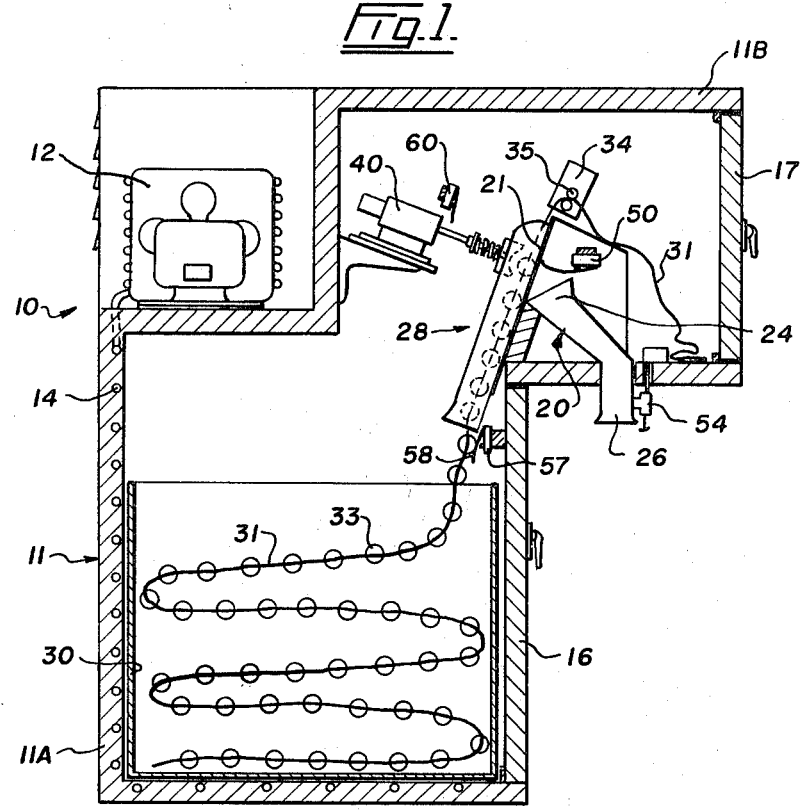

United States Patent [19]
Raitt

[11] 3,817,422
[45] June 18, 1974

[54] HARD ICE CREAM DISPENSING MACHINE

[76] Inventor: Edward D. Raitt, 5525 Blenheim St., Vancouver, British Columbia, Canada

[22] Filed: June 2, 1972

[21] Appl. No.: 259,096

[30] Foreign Application Priority Data
June 9, 1971  Canada.............................. 115170

[52] U.S. Cl. ............................................... 221/74
[51] Int. Cl............................................ B65h 29/54
[58] Field of Search .............. 221/74, 312 A, 79, 81

[56] References Cited
UNITED STATES PATENTS
3,166,214  1/1965  Stevens et al..................... 221/81 X
3,261,526  7/1966  Novak................................ 221/74
3,298,567  1/1967  Hahn .................................. 221/74

Primary Examiner—Stanley H. Tollberg
Attorney, Agent, or Firm—Fetherstonhaugh & Co.

[57] ABSTRACT

A dispensing machine for scoops of hard ice cream which are prepackaged on a carrier strip and stored in a refrigerated cabinet of the machine. When started by a manually operated control switch, the machine holds the strip against a stationary base plate, ejects an ice cream scoop from the strip causing it to fall down a delivery chute into a cone supported below the chute, and then advances the carrier strip to a predetermined position to complete one operating cycle of the machine.

4 Claims, 3 Drawing Figures

HARD ICE CREAM DISPENSING MACHINE

This machine relates to a machine for dispensing hard ice cream in individual scoop form.

A major problem faced by the vendors of hard ice cream cones and other hard ice cream servings is the labor and cost involved in removing the frozen material from a container as individual scoops. Scoop dispensing rates are low because of the physical difficulty encountered in scooping the normally hard frozen ice cream which in turn results in high labour costs. Furthermore, scoops which are dug manually from a container will vary considerably in size and this is unsatisfactory to all concerned.

My invention eliminates the need for hand scooping hard ice cream and enables the ice cream vendor to reduce dispensing labor and costs. The invention contemplates a mechanism comprising a scoop train guide, advancing mechanism, electrical control circuitry and a scoop ejector all within a refrigerated cabinet. The mechanism dispenses ice cream which has been formed into spheres and mounted on a strip of paper, plastic or the like so that it can be handled by the present machine. Since the ice cream scoops are of a standard size, the customers are better satisfied and there are no overservings to concern the retailer.

Although the invention herein described will have its major use in the dispensing of individual hard ice cream scoops, its application and advantages are not restricted to any such single product. It is apparent that the machine is capable of dispensing any product of proper size and composition which can be packaged in a suitable form to be fed to it.

Figure 2:
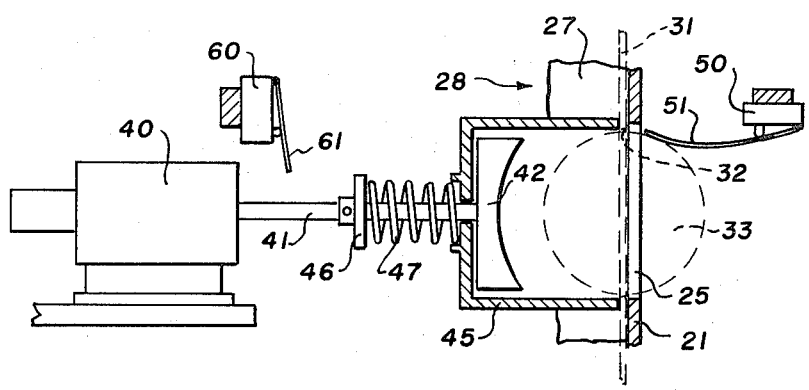
Figure 3:
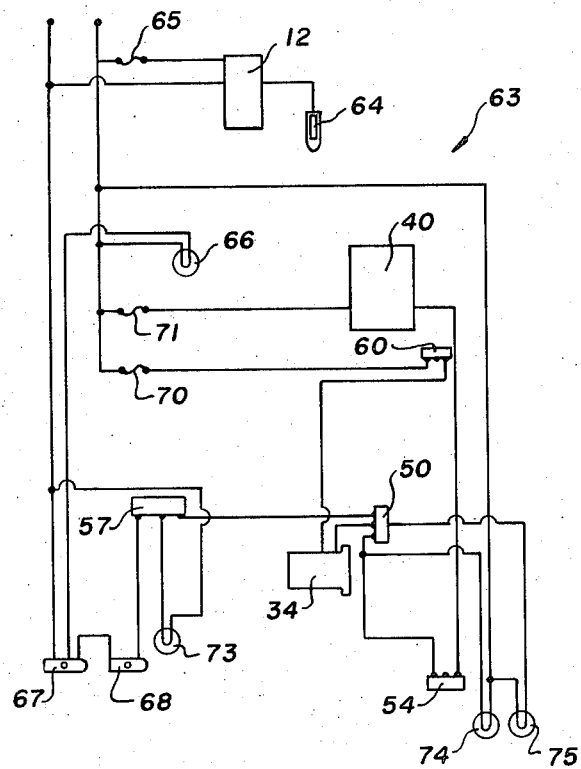

In drawings, which illustrate a preferred embodiment of the invention,

FIG. 1 is a vertical section, with parts in elevation and others omitted for clarity, of a hard ice cream dispensing machine, in accordance with the present invention, FIG. 2 is an enlarged side elevation, part in section showing a scoop ejector mechanism of the machine, and FIG. 3 is a wiring diagram showing the electrical components of the machine.

Referring first to FIG. 1, the numeral 10 indicates generally a hard ice cream dispensing machine constructed in accordance with this invention. This machine 10 comprises an insulated, refrigerated cabinet 11, the cabinet being cooled by a refrigeration unit 12 which circulates refrigerant through a coil 14. A lower part 11A of the cabinet is fitted with a door 16 and an upper overhanging cabinet part 11B has a door 17.

A delivery chute 20 is mounted in the cabinet part 11B to connect with a base plate 21 which is suitably supported in said part in a position slightly inclined to the vertical as shown in FIG. 1. The chute 20 has an open or inlet end 24, which registers with an opening 25 (FIG. 2) formed in the plate 21, and a lower or outlet end 26 of said chute depends below the cabinet part 11B. Associated with the base plate 21, on the opposite side thereof to the chute 20, are two transversely spaced flanges 27 which define with an adjacent part of the base plate, a guide channel 28, see particularly FIG. 2.

Part 11A of the cabinet is adapted to hold a box 30 containing a strip 31 of paper or the like. The strip 31 is provided with regularly spaced openings 32 (FIG. 2) in which scoops 33 of hard ice cream are releasably lodged. Thus, the flexible strip 31 provides a convenient carrier for ice cream scoops or other products.

This carrier strip 31 is adapted to be drawn upwardly along the guide means or channel 28 by suitable pulling means such as an electric motor 34 (FIG. 1) having feed rolls 35 between which the paper strip is threaded.

Suitably mounted in the cabinet part 11B, opposite the inlet end 24 of the delivery chute, is a dispensing mechanism in the form of solenoid 40 having a plunger 41, see particularly FIG. 2, the plunger being fitted with a head 42. A cylindrical and cup-like clamp 45 encloses the head 42, the clamp being slidably mounted on the plunger 41. Adjustably secured to the plunger 41, is a collar 46 against which a plunger-enclosing spring 47 is butted, the opposite end of this compression spring engaging the clamp 45 normally to hold it against the head 42.

The machine 10 has control means for the pulling means and the dispensing mechanism and therefor it is fitted with a normally open limit switch 50 which is suitably mounted in the cabinet 11 so that its operating arm 51 is disposed in the path of the uppermost ice cream scoop 33. A manually operated on-off starter switch 54 (FIG. 1) is secured in a convenient position below the bottom wall of the cabinet part 11B. An indicator switch 57 (FIG. 1) is mounted within the cabinet 11 below the guide channel 28. This normally open switch 57 has an operating arm 58 which is held in the switch-closed position by the passing scoops 33 with the switch remaining closed until the last scoop on the strip 31 has moved above the switch. Still another reset switch 60 is positioned in the cabinet 11 above the plunger 41 of the solenoid, this normally open switch having an operating arm 61 disposed in the path of the collar 46. It will be noted, particularly in FIG. 2, that the plunger 41 is shown in about mid-position. The clamp 45 is in contact with the strip 31 holding it against the base plate 21 but the head 42 has yet to be advanced into contact with a scoop 33. When the solenoid 40 is deenergized and the plunger 41 is fully retracted, the collar 46 engages the arm 61 to close the switch 60.

Referring now to FIG. 3, the above-mentioned electric elements are connected by a circuit generally indicated at 63 to other elements which will now be described. Circuit 63 includes the refrigeration machinery which ensures that the cabinet 11 and its contents are kept at a suitable temperature. Thus, circuit 63 consists of the standard condenser-compressor refrigeration unit 12 and a thermostatic control 64 and overload fuse 65 therefor. Element 66 is an interior cabinet light which is energized when a switch 67 is closed in response to opening of the cabinet door 16. A similar switch 68 in circuit 63 is operated by the door 17. Switches 67 and 68 deactivate all but the motor 12 and the interior light 66 if either door is open this being a safety feature. The circuit 63 also includes other fuses 70 and 71 as well as lights 73, 74 and 75.

To prepare the machine 10 so that it will operate to dispense hard ice cream, a box 30 filled with an accordian-folded carrier strip 31 is placed in the cabinet portion 11A and the uppermost end of the strip is fed through the guide channel 28 and between the feed rolls 35 of the drive motor. The strip 31 is advanced between the feed rolls to place the first scoop 33 in register with the opening 25 opposite the inlet end 24 of the delivery chute. When the first scoop reaches this position, limit switch 50 is actuated to open the circuit to the motor 34 and also to ready the solenoid 40 so that it can operate whenever the starter switch 54 is closed. As long as the motor 34 is in operation, the red light 75, which is mounted on front of the cabinet 11, is on to warm the machine operator that ice cream cannot be dispensed at this time. The red light 75 goes out and green light 74 comes on when the first scoop 33 is in the above described dispensing position.

In use, the operator of the machine 10 holds a biscuit cone (not shown) beneath the outlet end 26 of the delivery chute and presses the switch 54. This action energizes solenoid 40 to extend the plunger 41. The clamp 45 advances to hold the strip 31 against the base plate 21. Continued outward movement of the plunger 41 advances the head 42 to engage the scoop 33 whereby to push it out of its opening 32 into the chute 20, the scoop rolling down the chute and into the waiting cone. As the scoop 33 is ejected from the strip 31, the switch 50 is closed to start the motor 34 and deenergize the solenoid 40. The reset switch 60 is closed by the collar 46 when the plunger 41 reaches the fully retracted position and therefore the motor 34 can run to advance the strip 31 until the second scoop 33 is in position for ejection whereupon said motor is stopped by the closing of switch 50. The red light 75 goes out and the green light 74 comes on when switch 50 is closed and this informs the operator the motor 34 has stopped running and the machine is ready to dispense once again. This completes one dispensing cycle of the machine 10 which takes approximately 5 seconds.

The dispensing operation can be repeated over and over again in the above described manner until all but about five or six ice cream scoops have been ejected from the strip 31. As the last scoop 33 on the strip is raised above the indicator switch 57, said switch is actuated to turn on the externally-mounted cabinet light 73. The operator on seeing this light illuminated, is warned that it is time to reload the machine. To do this, he opens the door 16 and removes the empty box 30 replacing it with a full box. The ends of the two strips 31 are then stapled together and the door 16 is closed to actuate switch 67 whereupon normal dispensing can continue. Thus, there is no need to rethread the loaded strip 31 between the drive rolls 35 every time the machine is reloaded. The empty strip 31 is deposited in the cabinet part 11B and can be periodically removed therefrom through the door 17.

From the foregoing, it will be apparent the present machine can operate to dispense hard ice cream quickly and easily. Several switches and warning lights ensure a smooth and usually trouble-free dispensing action with the result that very little maintenance is required. The chute 24 and guide channel 28 can be cleaned quite readily at the end of each days operation and the remainder of the cabinet 11 requires only the attention usually given to any other refrigeration unit. The dispensing mechanism preferably is solenoid operated as described but it will be appreciated that the mechanism could be operated hydraulically, mechanically or pneumatically almost equally as well.

I claim:

1. A machine for dispensing ice cream scoops releasably secured to a flexible carrier strip and comprising a refrigerated cabinet, a delivery chute mounted in the cabinet and having an inlet end and an outlet end, a guide channel including a base plate for directing the carrier strip passed the inlet end, electric motor driven feed rolls for pulling the carrier strip along the guide channels, a solenoid having a plunger adjacent the inlet end, a head on the plunger, a clamp slidably mounted on the plunger to project beyond the head, spring means biasing the clamp towards the head, electric circuit means for the electric motor including a starter switch and a limit switch, said limit switch being operated automatically when a scoop to be dispensed is in register with the inlet end whereby to halt the electric motor and actuate the solenoid thereby ejecting said scoop from the carrier strip into the delivery chute.

2. A machine as claimed in claim 1, in which said electric circuit means includes a reset switch operated during the return stroke of the solenoid plunger to prepare said circuit for the next dispensing cycle.

3. A machine as claimed in claim 1, in which said electric circuit means includes an indicator switch and a warning light controlled thereby, said indicator switch being closed to energize the warning light by the last scoop on the carrier strip.

4. A machine for dispensing products releasably secured to a flexible carrier strip and comprising a delivery chute having an inlet end, guide means for directing the carrier strip passed the inlet end, pulling means for drawing the carrier strip along the guide means, a dispensing mechanism adjacent the inlet end; said dispensing mechanism including a plunger, a product-ejecting head on the plunger, a carrier strip-engaging clamp slidably mounted on the plunger, and spring means biasing the clamp towards the head; and control means for the pulling means and the dispensing mechanism, said control means including a starter device for actuating the pulling means, and an automatically operated limit device adapted firstly to halt the pulling means when a product to be dispensed is in register with the inlet end and secondly to actuate the dispensing mechanism whereby said product is ejected by the plunger head from the carrier strip into the delivery chute as said carrier strip is held against the guide means by the clamp.

* * * * *